United States Patent [19]

Reuben

[11] Patent Number: 4,804,567
[45] Date of Patent: Feb. 14, 1989

[54] AUTOMOTIVE FLOOR COVERING HAVING PAD ATTACHMENT MEANS

[75] Inventor: Harold Reuben, Akron, Ohio

[73] Assignee: Akro Corporation, Canton, Ohio

[21] Appl. No.: 198,990

[22] Filed: May 26, 1988

Related U.S. Application Data

[63] Continuation-in-part of Ser. No. 99,069, Sep. 21, 1987, Pat. No. 4,748,063.

[51] Int. Cl.⁴ .............................. B32B 3/06; B60J 9/00
[52] U.S. Cl. .......................................... 428/40; 428/79; 428/86; 428/88; 428/95; 428/99; 428/100
[58] Field of Search ................ 428/40, 79, 86, 88, 428/95, 99, 100; 15/215; 16/1, 4, 8

[56] References Cited

U.S. PATENT DOCUMENTS

| | | | |
|---|---|---|---|
| 2,250,669 | 7/1949 | Jamgotchian | 16/8 |
| 2,810,672 | 10/1957 | Taylor | 428/99 |
| 3,158,893 | 12/1964 | Smith | 16/4 |
| 4,012,544 | 3/1977 | Richards | 428/99 |
| 4,033,011 | 7/1977 | Endo et al. | 24/73 FT |
| 4,262,048 | 4/1981 | Mitchell | 428/99 |
| 4,280,729 | 7/1981 | Morawski | 15/215 |
| 4,361,610 | 11/1982 | Roth | 428/95 |
| 4,481,240 | 11/1984 | Roth | 428/95 |
| 4,588,628 | 5/1986 | Roth | 428/95 |
| 4,671,981 | 6/1987 | McLaughlin | 428/95 |
| 4,673,603 | 6/1987 | Roth | 428/95 |
| 4,692,364 | 9/1987 | Altus | 428/99 |

Primary Examiner—Marion C. McCamish
Attorney, Agent, or Firm—Bell, Seltzer, Park & Gibson

[57] ABSTRACT

A floor covering includes an automobile carpet having a carpet pad attaching means removably connected by a pressure sensitive adhesive layer to the carpet. The carpet pad attaching means includes a base having projections extending upwardly therefrom which interengage with projections extending downwardly from the backside of a carpet pad for preventing shifting of the carpet pad when it is placed in overlying relation to the carpet and carpet pad attaching means.

10 Claims, 2 Drawing Sheets

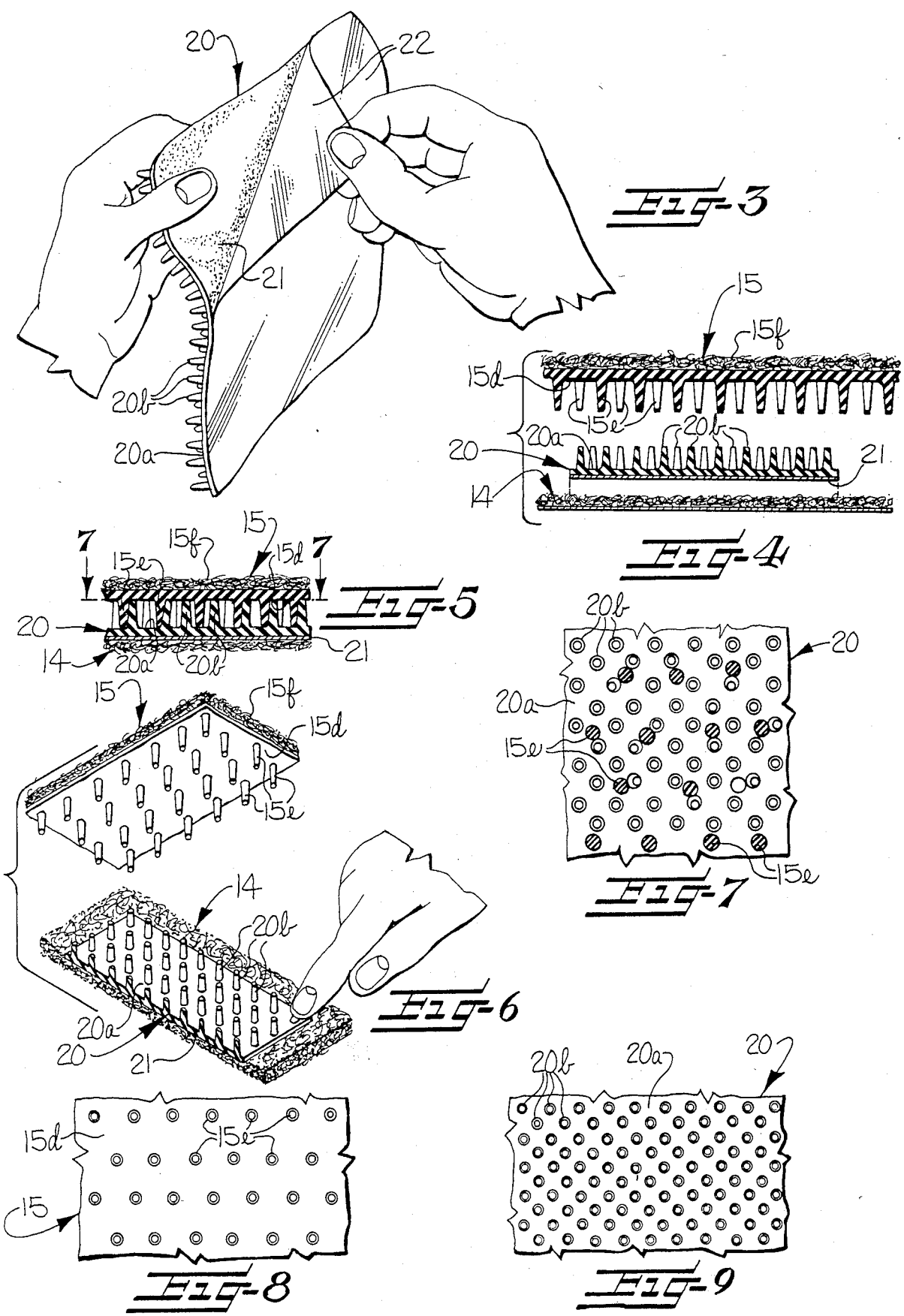

AUTOMOTIVE FLOOR COVERING HAVING PAD ATTACHMENT MEANS

FIELD OF THE INVENTION

This application is a continuation-in-part of application Ser. No. 099,069 filed Sept. 21, 1987 now U.S. Pat. No. 4,748,063.

BACKGROUND OF THE INVENTION

This continuation-in-part application is closely related to the aforementioned parent application. In the parent application, a carpet pad attaching means having integrally formed upstanding projections was disclosed as being suitably bonded to the face of an automobile carpet for purpose of cooperating in intermeshing relationship with an overlying carpet pad having downwardly extending projections so as to prevent shifting of the carpet pad relative to the underlying carpet and ensure maintenance of the carpet pad in its desired placed relationship overlying the automobile carpet. More particularly, the parent application was directed to having a carpet pad attachment means pre-attached to an underlying carpet during manufacture of the automobile. When secured to the underlying carpet during manufacture, the carpet pad attaching means is supplied as a pre-market feature of the automobile.

In the instant application, the carpet pad attaching means has been modified so as to be directed to the wholesale and retail market selling new or replacement parts. Such a need is readily apparent. In those automobiles which have been manufactured without carpet pad attaching means secured to an underlying floor, either the owners must supply means of their own which ensures maintenance of a carpet pad in overlying position to the automobile carpet, or an owner must contend with the constant shifting of the carpet pad, especially during entry and exit by occupants of a motor vehicle.

With the foregoing in mind, it is an object of this invention to provide an automobile floor covering having a carpet pad attaching means removably connected to the face of an automobile carpet wherein the carpet pad attaching means is effective to prevent a carpet pad having downwardly extending projections on its backside from shifting out of its desired placed relationship overlying the automobile carpet.

It is another object of this invention to provide an automobile floor covering having a carpet pad attaching means which may be removably connected to a localized area of an automobile carpet such as the area corresponding to that area of the carpet upon which the driver's heel would rest when operating the accelerator of the automobile.

SUMMARY OF THE INVENTION

In accordance with the present invention, a floor covering for an automobile includes an automobile carpet of a predetermined size and configuration and at least one carpet pad overlying a predetermined area of the carpet. A carpet pad attaching means is removably connected to the face of the carpet in at least one localized area of the carpet and comprises a flexible base having opposing faces thereon and a unitary group of upstanding integrally formed spaced apart projections which extend upwardly from one face of the base. The projections are unitized by the base to provide a unitary group of upstanding projections. A pressure sensitive adhesive layer is applied on the opposite face of the base for removably connecting the carpet pad attaching means to the face of the carpet and for permitting ready removal of the carpet pad attaching means from the carpet.

The carpet pad includes a plurality of downwardly extending integrally formed spaced apart projections connected thereto and which depend from th backside thereof so as to penetrate into the underlying carpet for preventing shifting of the pad. Some of the projections depending from the pad are in intermeshing relationship with the unitary group of upstanding projections and serve to ensure maintenance of the carpet pad in its desired placed relationship overlying the automobile carpet.

In the preferred embodiment, the upstanding projections on the carpet pad attaching means are substantially greater in number per square inch than the depending projections on the overlying carpet pad so as to provide an enhanced intermeshing relationship between the upstanding and depending projections. Also, the number of upwardly extending projections are at least three times greater in number per square inch than the number of downwardly extending projections so that a substantial number of donwardly extending projections are grippingly engaged by a plurality of upwardly extending projections.

To help maintain an intermeshing relationship among upstanding and depending projections, the upstanding projections are smaller than the depending projections, and substantially all of the upstanding and depending projections are substantially frustoconically shaped. In addition, depending projections are longer than the upstanding projections so that the lower ends of the depending projections can frictionally engage the areas between the upstanding projections to thereby increase the frictional force resisting shear between the carpet pad and the underlying automobile carpet.

BRIEF DESCRIPTION OF THE DRAWINGS

The foregoing and other objects, features and advantages of the present invention will become apparent from the following detailed description of the preferred embodiment of the invention, and from the drawings, in which:

FIG. 3 is an isometric view showing unpeeling of the release cover from off the carpet pad attaching means.

FIG. 4 is a partially exploded, enlarged, fragmentary vertical sectional view through the carpet pad, carpet pad attaching means and the underlying carpet.

FIG. 5 is a view similar to FIG. 4, but showing portions of the carpet pad attaching means and the carpet pad in intermeshing relationship and the carpet pad attaching means releasably connected to the underlying carpet.

FIG. 6 is a composite partially exploded isometric view of corresponding portions of the carpet pad backside and the carpet pad attaching means showing a preferred arrangement of the respective downwardly and upwardly extending projections of the carpet pad and carpet pad attaching means.

FIG. 7 is a fragmentary sectional plan view taken substantially along line 7–7 of FIG. 5 and showing the positional or intermeshing relationship of the upstanding and depending projections.

FIG. 8 is a fragmentary inverted plan view of the carpet pad illustrating a few of the downwardly extending integrally formed spaced apart projections connected to and depending from the backside of the carpet pad; and FIG. 9 is a plan view similar to FIG. 8, but showing the upper face of the carpet pad attaching means so as to illustrate the preferred greater density of the upwardly extending projections on the carpet pad attaching means as compared with the density of the downwardly extending projections on the carpet pad shown in FIG. 8.

DETAILED DESCRIPTION

Figure 1:
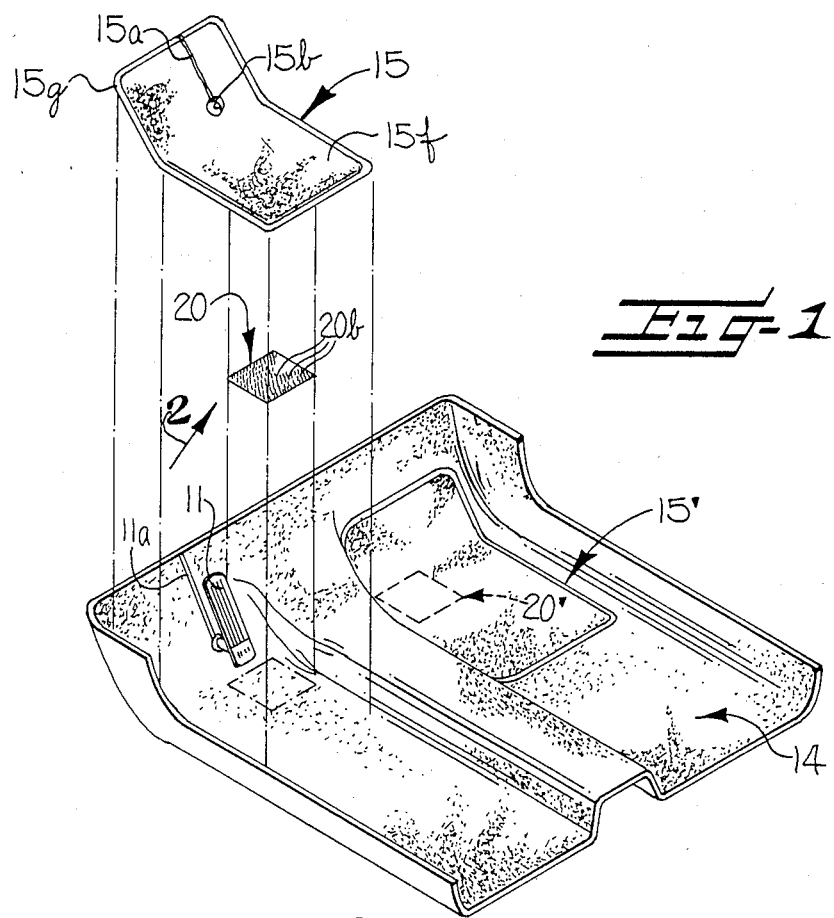
FIG. 1 is a partially exploded isometric view of the invention showing an automobile carpet configured to the contours of an automobile floor board and also showing the positioning of the carpet pad attaching means relative to the automobile carpet and the carpet pad.

Referring more specifically to the drawings, a preferred embodiment of the invention is shown in FIG. 1 wherein a floor covering embodied in an automobile carpet 14 is illustrated as though resting upon and conforming to the floorboard of an automobile, not shown. The portion of the carpet 14 shown in FIG. 1 serves as the usual passenger compartment of the automobile, and on the driver's side of the compartment, the floorboard supports the usual throttle or accelerator pedal 11 adapted to be engaged and operated by the driver's foot, as is usual. It is apparent that the automobile carpet 14 is of a predetermined size and configuration to cover a typical floorboard of an automobile.

As shown in FIG. 1, two carpet pads 15, 15' are overlying the respective driver's and passenger's sides of the automobile carpet 14. Both carpet pads 15, 15' may be of essentially the same construction and may be attached to the face of the automobile carpet in the same manner and in accordance with the present invention. Therefore, only the carpet pad 15 overlying a predetermined area of the driver's side of the automobile carpet 14, and the associated attaching means, will be described in detail in order to avoid repetitive description.

Although the carpet pad 15 may contribute little to the safety or operability of the automobile, carpet pads have become standard accessories in virtually all new makes and models of automobiles, since they are the only feasible and economical means capable of protecting the automobile carpets which are generally quite expensive. Typically, the carpet pad 15 on the driver's side of the automobile is shaped and dimensioned so as to fit under the accelerator pedal 11 and to thereby provide the desired protective covering for the automobile carpet 14 in the area of the floorboard where the driver's feet rest. Accordingly, the forward portion of the carpet pad 15 is provided with a slit 15a which terminates in an opening 15b to enable an installer to readily position the forward portion of the carpet pad 15 beneath the accelerator pedal 11 and in surrounding relation to the usual throttle shaft 11a extending downwardly from the accelerator pedal 11 and through the floorboard.

As is well known, with the repeated shuffling of a driver's foot during driving and upon exit and entry from the automobile, a conventional automobile carpet pad, having no suitable means to secure the same to the automobile carpet therebeneath, has frequently shifted from its desired placed relationship overlying the automobile carpet and occasionally would form into a "crumpled" or "bunched" condition under the accelerator pedal, with the attendant danger of the bunched carpet pad causing the accelerator pedal to stick. The present invention overcomes this deficiency by removably connecting to the automobile carpet 14 a carpet pad attaching means, broadly designated at 20 in at least one localized area of the automobile carpet 14. With particular reference to the attaching means 20 on the driver's side of the passenger compartment, the carpet pad attaching means should be desirably located in that localized area of the automobile carpet 14 wherein the driver's heel would rest when depressing the accelerator pedal 11 of the automobile. The carpet pad attaching means 20 of this invention ensures maintenance of the carpet pad 15 in its desired placed relationship when present in overlying relation to the automobile carpet 14, thus preventing undue shifting and displacement of the carpet pad 15. In the preferred embodiment, since the carpet pad attaching means 20 is positioned in a localized area adjacent the accelerator pedal 11, it may serve to replace the conventional heel wear pad provided in most automobiles. In FIG. 1, the carpet pad ataching means 20' is shown located on the passenger side of the vehicle to prevent displacement of that carpet pad 15' from its desired placed relationship. However, since there is virtually no danger in the vehicle's operation in the event that the carpet pad 15' is shifted on the passenger side of the vehicle, cost considerations may dictate that a carpet pad attaching means made in accordance with the present invention be provided only on the driver's side of the passenger compartment.

The automobile carpet 14 and carpet pad 15 may be of conventional or other construction provided that the carpet pad 15 has a plurality of downwardly extending integrally formed spaced apart projections 15e connected thereto and depending from the backside thereof for cooperating with the improved attaching means 20. Accordingly, as best seen in FIGS. 4, 5 and 6, the carpet pad 15 comprises a relatively thin, flexible backing 15d of elastomeric or rubber-like material having on the underside thereof a plurality of the spaced apart downwardly extending projections 15e which are integrally formed in that they depend from and are integral with the backing 15d. Conventionally, the projections 15e are of tapered or frustoconical shape and are adapted to penetrate into the underlying automobile carpet 14 for aiding in preventing shifting of the carpet pad 15 relative to the automobile carpet 14. It is apparent that the projections 15e on the backside of the carpet pad 15 can engage and penetrate into the automobile carpet 14 to provide some restraining force against shifting movement thereof. However, the amount of movement restraint which these projections alone can provide through simply engaging the carpet has not been found to be sufficient to practically anchor the pad against slipping. To ensure restraint against the carpet pad 15 shifting, relative to the carpet 14, some of the downwardly extending projections 15e engage the improved carpet pad attaching means 20, as will be presently described. As preferred, a mat or facing 15f of conventional construction, e.g., knit, woven or non-woven material, defines the upper side or face of carpet pad 15 and is suitably secured on the side of the backing 15d opposite from the side from which the projections 15e extend. Desirably, the mat 15f covers substantially the entire upper surface of the backing 15d and may be secured thereto by any suitable means, such as suitable stitching extending through piping 15g (FIGS. 1 and 2) extending along and folded over the peripheral edges of the backing and the mat or facing 15f of the carpet pad 15.

Referring now to FIGS. 1-7 and 9, the carpet pad attaching means 20 comprises a backing 20a molded of elastomeric or rubber-like material which may be similar to the material of which the carpet pad backing 15d and its downwardly extending projections 15e are formed. The underside of the backing 20a includes thereon a pressure sensitive adhesive layer 21 for releasably connecting the carpet pad attaching means 20 to the face of the carpet 14. The type of pressure sensitive adhesive used may be readily chosen from a wide variety of well-known materials chosen by one skilled in the art depending on the elastomeric makeup of the backing 20a. Such adhesives used in an amount chosen by one skilled in the art for its intended purpose desirably provide high shear strength to resist slippage of the carpet pad attaching means 20 when it is releasably secured to an automobile carpet 14 and low tensile strength to facilitate removal and replacement from the automobile carpet. Following installation, should the carpet pad attaching means 20 become worn or damaged, the present attaching means can be peeled off the carpet 14 and a replacement applied thereto.

Figure 2:
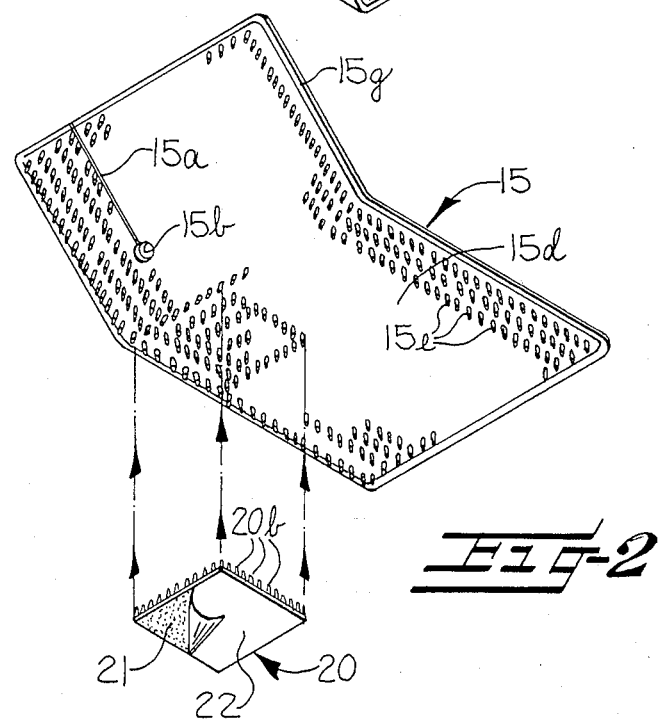
FIG. 2 is an isometric view looking in the direction of the arrow 2 in FIG. 1 and showing the underside or backside of the carpet pad and the bottom face of the carpet pad attaching means having the adhesive layer and release cover applied thereto.

As best seen in FIGS. 2 and 3, a release cover 22 is releasably secured to the pressure sensitive adhesive layer 21 to protect and maintain the tackiness of the adhesive layer before removable connection of the carpet pad attaching means 20 to an automobile carpet 14. In use, the release cover can be peeled away from the carpet pad attaching means 20 so as to expose the pressure sensitive adhesive layer 21 (FIG. 3). Once the adhesive layer 21 is exposed, the carpet pad attaching means 20 can be applied to the automobile carpet 14.

In the illustrated embodiment, the size of the attaching means backing 20a is substantially less than the overall size of the carpet 14 and the carpet pad 15 so that the attachment means may be connected to the face of the carpet 14 in at least one localized area of the carpet. However, the attaching means 20 may be of any shape or size suitable for its intended purpose. By way of example, the shape of the attaching means may be square, round, oblong or irregular, and/or the attaching means 20 may be of about the same shape and size as the conventional heel wear pad provided on the carpets of most automobiles adjacent the throttle control pedals thereof. A 6"×8" rectangular carpet pad attaching means has served quite well in experimental use of the invention.

The attaching means 20 further comprises a unitary group of upstanding integrally formed spaced apart frustoconically shaped projections 20b extending upwardly from the upper face of the backing 20a and thus extending upwardly from the face of the automobile carpet 14. The upstanding projections 20b are integrally formed by being formed integral with the backing 20a from which the projections 20b extend upwardly and are elastomeric and have such flexural rigidity as to return to an upright position if manually deflected therefrom (FIG. 6). When the carpet pad 15 is positioned upon the carpet 14, some of those projections 15e depending from the pad 15 are positioned in intermeshing relationship with the unitary group of upstanding projections 20b and serve to ensure maintenance of the carpet pad 15 in its desired placed relationship overlying the automobile carpet 14.

When the carpet pad 15 overlies the carpet pad attaching means 20, those projections 15e which depend from the carpet pad 15 and which overlie the carpet pad attaching means 20 grippingly engage in an intermeshing relationship with those projections which extend upwardly from the carpet pad attaching means 20 and serve to ensure maintenance of the carpet pad 15 in its desired placed relationship overlying the carpet pad 14.

To assure that the intermeshing of the depending and upstanding projections is effective to prevent any unintentional carpet pad 15 displacement, the upwardly extending projections 20b of the carpet pad attaching means 20 are smaller in cross section and greater in number per square inch than the downwardly depending projections 15e (FIGS. 7-9) so as to provide an enhanced intermeshing relation between the upstanding and depending projections. In the preferred embodiment of the invention, the more dense upstanding projections 20b are at least a dozen in number per square inch and are illustrated arranged in staggered relationship in adjacent rows with about 34 projections per square inch. This compares to the less dense depending projections 15e which are integrally formed on the backing 15d, also in staggered relation of about 9 projections per square inch.

The depending projections 15e are also longer than the upstanding projections 20b of the carpet pad attaching means 20 so that the lower ends of the depending projections 15e can frictionally engage the areas between the upstanding projections 20b to thereby increase the frictional force resisting shear between the carpet pad 15 and the underlying automobile carpet 14. In a preferred commercial embodiment, the upstanding projections 20b are less than ¼ inch in height and preferably approximately 3/16 inch in height while the depending projections 15e are approximately ¼ inch in height.

In actual use, when the carpet pad 15 is initially placed over the carpet 14, some of the projections 15e depending from the pad 15 intermesh with the unitary group of upstanding projections 20b of the carpet pad attaching means 20. Because the upstanding projections 20b are elastomeric (as are the downwardly extending projections 15e), they readily flex (see FIGS. 5, 6 and 7) to allow full intermeshing between the shorter in length and more dense upstanding projections 20b and the longer and less dense depending projections 15e. Thus, there is assurance that a substantial number of downwardly extending projections 15e are grippingly engaged by a plurality of the upwardly extending projections 20b to ensure maintenance of the carpet pad 15 in its desired placed relationship overlying the carpet 14.

The foregoing embodiments are to be considered illustrative rather than restrictive of the invention and those modifications which come within the meaning and range of equivalents of the claims are to be included therein.

That which is claimed is:

1. A floor covering for nn automobile comprising an automobile carpet of a predetermined size and configuration, at least one carpet pad overlying a predetermined area of said carpet, and carpet pad attaching means removably connected to the face of said carpet in at least one localized area of the carpet and comprising a flexible base having opposing faces thereon, a unitary group of upstanding integrally formed spaced apart projections extending upwardly from one face of said base and being unitized by said base to provide a unitary group of upstanding projections, a pressure sensitive adhesive layer on the opposite face of said base for removably connecting to the face of the carpet and for permitting ready removal of said carpet pad attaching means from said carpet, said carpet pad having a plurality of downwardly extending integrally formed spaced apart projections connected thereto and depending from the backside thereof and adapted to penetrate into said underlying carpet for preventing shifting of the pad, some of said projections depending from said pad being in intermeshing relationship with said unitary group of upstanding projections and serving to ensure maintenance of the carpet pad in its desired placed relationship overlying the automobile carpet.

2. A floor covering for an automobile according to claim 1 wherein said upstanding projections on said carpet pad attaching means are substantially greater in number per square inch than said depending projections on said overlying carpet pad so as to provide an enhanced intermeshing relation between the upstanding and depending projections.

3. A floor covering for an automobile according to claim 1 wherein the number of said upwardly extending projections are at least three times greater in number per square inch than the number of said downwardly extending projections, and wherein a substantial number of said downwardly extending projections are grippingly engaged by a plurality of said upwardly extending projections.

4. A floor covering for an automobile according to claim 1, 2 or 3 wherein said upstanding projections are smaller than said depending projections, and substantially all of said upstanding and depending projections are substantially frustoconically shaped.

5. A floor covering for an automobile according to claim 1, 2 or 3 wherein said depending projections are longer than said upstanding projections so that the lower ends of said depending projections can frictionally engage the areas between said upstanding projections to thereby increase the frictional force resisting shear between the carpet pad and underlying automobile carpet.

6. A floor covering for an automobile according to claim 1 wherein said upstanding projections of said unitary group of projections are elastomeric and have such flexural rigidity as to return to an upright position if manually deflected therefrom.

7. A floor covering for an automobile comprising an automobile carpet of a predetermined size and configuration, at least one carpet pad overlying a predetermined area of said carpet, and carpet pad attaching means removably connected to the face of the carpet in at least one localized area of the carpet, said carpet pad attaching means comprising a flexible base having opposing faces thereon, a unitary group of upstanding spaced apart projections extending upwardly from one face of said base and being unitized by said base to provide a unitary group of upstanding projections, and wherein said base and said upstanding projections are elastomeric and integrally formed with each other, a pressure sensitive adhesive layer on the opposite face of said base for removably connecting to the face of the carpet and for permitting ready removal of said carpet pad attaching means from said carpet, said carpet pad having a plurality of elastomeric and downwardly extending spaced apart projections connected thereto and depending from the backside thereof and wherein said upstanding projections on said carpet pad attaching means are smaller in cross section, shorter in length, and substantially greater in number per square inch than said depending projections on said carpet pad, and substantially all of said upstanding and depending projections are substantially frustoconically shaped and wherein said downwardly extending projections are adapted to penetrate into said underlying carpet for preventing shifting of the pad, some of said projections depending from said pad being in intermeshing relation with said unitary group of upstanding projections and wherein a substantial number of said downwardly extending projections are grippingly engaged by a plurality of said upstanding projections so as to prevent shifting of the pad and ensure maintenance of the carpet pad in its desired placed relationship overlying the automobile carpet.

8. A floor covering for an automobile comprising an automobile carpet of a predetermined size and configuraion, and carpet pad attaching means removably connected to the face of said carpet in at least one localized area of the carpet and comprising a flexible base having opposing faces thereon, a unitary group of upstanding integrally formed spaced apart projections extending upwardly from on face of said base and being unitized by said base to provide a unitary group of upstanding projections which are adapted to intermesh with projections depending from the backside of a carpet pad for serving to ensure maintenance of a carpet pad in its desired placed relationship when present in overlying relation to the automobile carpet, and a pressure sensitive adhesive layer on the opposite face of said base for removably connecting to the face of the carpet and for permitting ready removal of said carpet pad attaching means from said carpet.

9. A floor covering for an automobile comprising an automobile carpet of a predetermined size and configuration for covering the floor of at least the front portion of an automobile, and carpet pad attaching means removably connected to said carpet in at least one localized area of the carpet corresponding to that area of the carpet wherein the driver's heel would rest when depressing the accelerator of the automobile, said carpet pad attaching means comprising a flexible base having opposing faces thereon, a unitary group of upstanding integrally formed spaced apart elastomeric projections extending upwardly from one face of said base and being unitized by said base to provide a unitary group of upstanding projections, said upstanding projections being less than ¼ inch in height and at least a dozen in number per square inch, and adapted to intermesh with projections depending from the backside of a carpet pad for serving to ensure maintenance of a carpet pad in its desired placed relationship when present in overlying relation to the automobile carpet, the flexural rigidity of said upstanding projections being such as to return the projections to an upright position if manually deflected therefrom, and a pressure sensitive adhesive layer on the opposite face of said base for removably connecting to the face of the carpet and for permitting ready removal of said carpet pad attaching means from said carpet.

10. A floor covering to be used to protect a predetermined area of a carpet in an automobile comprising a carpet pad adapted for overlying a predetermined area of an automobile carpet, said carpet pad having a plurality of outwardly extending integrally formed spaced-apart projections connected thereto depending from the backside thereof, a relatively small carpet pad attaching means having a flexible base with opposing faces thereon, a pressure sensitive adhesive layer on one face of said base adapted for being removably connected to the face of the carpet and for permitting ready removal therefrom, a unitary group of integrally formed spaced-apart projections extending outwardly from the opposite face of said base and being in intermeshing relationship with some of said projections extending from the backside of said carpet pad, and a release cover releasably secured to said pressure sensitive adhesive layer to protect and maintain the tackiness of said adhesive layer before removable connection of the carpet pad attaching means to an automobile carpet.

* * * * *